United States Patent
Dahanayake et al.

(10) Patent No.: US 6,235,149 B1
(45) Date of Patent: May 22, 2001

(54) ACRYLIC ACID/MALEIC ACID COPOLYMERS AS DETACKIFICATION AGENTS FOR ADHESIVES CONTAINED IN SECONDARY FIBER

(75) Inventors: Manilal S. Dahanayake, Princeton Junction; Jiang Yang, Hightstown, both of NJ (US)

(73) Assignee: Vinings Industries, Inc., Kennesaw, GA (US)

( * ) Notice: Subject to any disclaimer, the term of this patent is extended or adjusted under 35 U.S.C. 154(b) by 0 days.

(21) Appl. No.: 09/167,265

(22) Filed: Oct. 7, 1998

Related U.S. Application Data

(60) Provisional application No. 60/061,954, filed on Oct. 14, 1997.

(51) Int. Cl.⁷ ............................... D21C 5/02; D21C 9/08
(52) U.S. Cl. ......................... 162/5; 162/48; 162/DIG. 4
(58) Field of Search ................. 162/48, 199, DIG. 4, 162/72, 76, 4, 5; 510/477

(56) References Cited

U.S. PATENT DOCUMENTS

| | | | |
|---|---|---|---|
| 4,698,133 | 10/1987 | Moreland | 162/5 |
| 4,781,794 | 11/1988 | Moreland | 162/199 |
| 4,886,575 | 12/1989 | Moreland | 162/5 |
| 4,956,051 | 9/1990 | Moreland | 162/199 |
| 5,292,403 | 3/1994 | Dreisbach et al. | 162/158 |
| 5,415,739 | 5/1995 | Furman et al. | 162/158 |
| 5,556,510 * | 9/1996 | Dreisbach et al. | 162/DIG. 4 |
| 5,962,401 * | 10/1999 | Yamaguchi et al. | 510/477 |

* cited by examiner

Primary Examiner—Steve Alvo
(74) Attorney, Agent, or Firm—Alston & Bird LLP

(57) ABSTRACT

An improved method for inhibiting the deposition of adhesive contaminants, hot melts and/or pressure sensitive adhesive materials onto the surfaces of secondary paper products and repulping equipment during the manufacture of same from waste paper products comprises the application of a water-soluble dispersant selected from the group consisting of a hydrophobically modified hydrocolloid or an acrylic acid polymer. The dispersant, preferably a modified guar gum or sodium acrylic acid/maleic acid copolymer improves product quality and papermaking equipment performance.

7 Claims, No Drawings

ACRYLIC ACID/MALEIC ACID COPOLYMERS AS DETACKIFICATION AGENTS FOR ADHESIVES CONTAINED IN SECONDARY FIBER

This application claims the benefit of Provisional Ser. No. 60/061,954 filed Oct. 14, 1997.

FIELD OF THE INVENTION

The present invention relates generally to processes for the recyclization of waste and in particular paper products. More specifically, the invention relates to processes for the preparation of secondary paper products from recycled paper materials.

BACKGROUND OF THE INVENTION

The recycling and transformation of waste paper materials into secondary paper products is important from an environmental standpoint as well as an economical one. Not only does it save natural resources and reduce volumes of trash and pollution, but if carried out in an efficient manner, utilizes an inexpensive source of paper filler. However, a number of problems must be overcome in the successful transformation of waste paper materials to secondary paper of suitable quality and performance.

The secondary fiber industry utilizes waste paper or paper products as a source of paper fiber (commonly referred to as "secondary fiber") to produce finished paper products. Waste paper and paper products that are the source of the secondary fiber include any waste paper materials such as newspapers, books magazines, waste bags and boxes, mixed office waste, computer printout, ledger, etc. The once-processed papers contains various types of adhesives (pressure sensitive, hot melts, etc.), inks, and coating binders. An extensive list of natural and synthetic adhesives found in different grades of paper is described in the article, "Stickies Control by Detackification", Robert D. Moreland, 1986 Pulping Conference, pp. 193–196. This article also describes in some detail the problem solved by the present invention.

Different adhesive materials as well as pitch are present in paper fiber furnishes and a particular problem in paper recycling is the presence of adhesives, ink and coating binders (primarily those composed of synthetic polymers) that are found on some of the waste paper being utilized. More specifically, labels, decals, stickers, stamps, envelopes, book bindings, etc., each have adhesives associated therewith and these must be removed when the waste products are recycled. These adhesive contaminants, known in the trade as "stickies and tackies" cause numerous problems, both in terms of process and product performance. Some of the commonly used adhesive materials include, for example, styrene butadiene rubber, vinyl acrylate, polyvinyl alcohol, natural rubber, isoprene polystyrene, polypropylene, ethylene vinyl acetate and the like.

In papermaking, pitch is present in the form of a mixture of calcium carbonate, calcium soaps from wood components and other miscellaneous residues. A tacky, viscous substance, it is used extensively in the papermaking process and in the past has been extremely difficult to remove.

Specifically, the contaminants deposit on and adhere to machine surfaces throughout the paper processing machine thereby disrupting operations. They can fill or plug forming fabrics and press felts. The stickies will also mark or hole the paper sheet. If the contaminants are present in the paper, they will cause sheet defects or spots. This results in poor visual aesthetics of the paper, and poor surface properties can result in printing difficulties. The tackiness of these contaminants may also cause adjacent sheets, when wound in roll form, to adhere to one another. This can cause tears, breaks and holes in the converting processes.

Since stickies generally have the same density as water and fiber, they are difficult to remove. The stickies may be pliable and therefore cannot be completely screened from the water and/or fiber mixture. Equipment currently being utilized is effective to a certain degree but not 100%.

Obviously, production economics are affected quite severely when stickies-related problems are encountered. Stickies commonly necessitate complete shutdown of the manufacturing equipment in order to remove such by solvent washing techniques. The cleaning process is expensive due to downtime as well as solvent costs.

To deal with the problem of stickies and tackies, a number of strategies have been employed by papermakers. These strategies include mechanical and chemical means to either remove or passivate the contaminants.

Mechanical means of removing the contaminants include slotted pressure screens, hydrocyclones, and cleaners of various types. Also, thermal/mechanical dispersion units are employed to break the contaminants into micron sized particles, which are then difficult to detect in the final sheet. Despite these techniques, 100% removal of contaminants by mechanical means cannot be accomplished.

Chemically, several approaches are taken, including passivation or detackification of the sticky contaminant surfaces. Such detackification agents, include inorganic materials such as talc and zirconium compounds, organic materials such as polyvinyl alcohol, and hydrophobic synthetic fibers such as polypropylene. In addition, various dispersants may be used to prevent the contaminants from agglomerating. The small dispersed contaminants may be fixed to the paper sheet by the use of cationic polymers. Finally, if the contaminant problem becomes severe, solvents will be used to wash and remove the materials from the machine clothing.

The present invention relates to a method of detackifying secondary fiber paper pulps by treating the pulps with a hydrophobically modified guar and sodium acrylic-maleic acid copolymers.

U.S. Pat. No. 5,415,739 to Furman et al. discloses a process for the detackification of adhesive contaminants in secondary fiber paper pulps using a water soluble terphthalate glycol terpolymer. The terpolymer is prepared as the distillation product of polyethylene glycol monomers comprising at least 80% of the terpolymer; a phthalic ester moiety and a simple glycol such as ethylene glycol, propylene glycol and the like. The terpolymer is either added directly to the furnish prior to sheet formation or is sprayed on afterwards in the shower water used to clean off the fabrics and felts employed during sheet formation and dewatering.

U.S. Pat. No. 4,956,051 to Moreland discloses the use of a polyvinyl alcohol polymer to detackify adhesive materials contained in the secondary fibers of recycled waste papers. The polyvinyl alcohol polymer also contains some hydrophobic moieties such as acetate, propionate, butyrate and the like. The compound is added to the water sprays and showers used to wash the felts, wires and press rolls.

U.S. Pat. No. 4,886,575 also to Moreland discloses and claims a method for the detackification of hot melt and/or pressure sensitive adhesive materials contained in a fibrous paper sheet made from waste paper materials using a polyvinyl alcohol polymer that contains at least some hydrophobic groups such as acetate, propionate or butyrate, is 70–99% hydrolyzed and is water-soluble. The polymer is added to the water spray or shower for application to the paper sheets once pressed.

Finally, U.S. Pat. Nos. 4,781,794 and 4,698,133 also to Moreland disclose a method for the prevention of the deposition of adhesive materials contained in the waste paper materials used to make secondary paper products. The process entails the use of lower alkyl derivatives of cellulose in a dilute solution that is applied during the shower rinse of conventional secondary paper manufacturing production lines. Suitable derivatives include water soluble methyl ether derivatives such as methyl cellulose, hydroxypropyl methyl cellulose; hydroxybutyl methyl cellulose and the like. These are nonionic in nature and may also be used to spray the machine rollers and parts.

None of these prior art methods have been able to completely passivate the "stickies" and other contaminants which render the final paper product less than ideal and often times cause substantial defects and flows. It is an object of the present invention then, to provide a superior detackification process for use in the paper industry that prevents substantially all of the adhesive contaminant from depositing on and incorporating into the secondary paper products made from recycled waste materials or virgin pulp. The process is carried out using standard methods known in the art and yet provides a superior product at lower costs.

SUMMARY OF THE INVENTION

The present invention is a method for the detackification of adhesive contaminants existing in secondary paper fiber pulps used to make recycled paper. The process comprises applying to the paper stock or pulp slurry a polymer selected from the group comprising a hydrophically modified guar gum, sodium acrylic-maleic acid copoylmers or mixtures thereof. The polymer is added in a concentration of from about 1.0 ppm to about 30 ppm and is added at a point during the rolling process when there is intimate contact between the solution and the contaminated paper.

DETAILED DESCRIPTION OF THE INVENTION

The invention comprises a method for detackifying the adhesive contaminants and pitch that exists in paper pulps composed predominantly of secondary fibers. The adhesive contaminants are prevented from adhering to the surfaces of paper sheets and the equipment used to make the sheets by adding to the pulp slurry or the spray or shower water used to clean the fabrics and felts employed during sheet formation and dewatering, a detackifying amount of hydrophobic derivative of guar gum, a sodium acrylic-maleic acid copolymer and mixtures thereof.

The hydrophobic guar gum derivative useful in the process of the present invention is structurally represented by the formula:

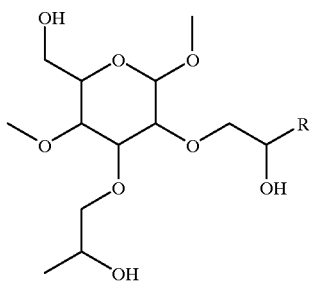

wherein R represents a $C_4$–$C_{22}$ alkyl and the molecular weight of the guar may vary from about 10,000 to about 1,000,000. Preferably, the modified guar is hydroxy propyl guar commercially available under the tradename Jaguar® (Rhone-Poulenc, Inc. Cranbury, N.J.). Other suitable nonionic hydrocolloids include modified xanthan gum, gellan gum, acacia gum and mixtures thereof.

Another group of polymer dispersants useful in the practice of the present invention include acrylic acid polymers and copolymers such as sodium acrylic acid polymers represented by long chains comprised of repeating structural units consisting of

wherein x is a number of from about 20 to 100.

Other suitable dispersants comprise copolymers of acrylic acid and maleic acid. In particular, these comprise sodium acrylic/maleic acid copolymers of the repeating structural unit:

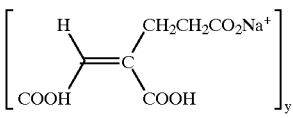

wherein y is a whole number of from about 20 to 100. Preferably, a sodium acrylic-maleic acid copolymer is used with a molecular weight of from about 17,000 to 20,000. Other useful copolymers include polyacrylamide, acrylamidopropyl sulfonic acid acrylic acid/methacrylic acid copolymers, acrylic acid/itaconic acid copolymers, acrylic acid/hydroxypropyl acrylate copolymers, maleic acid and polymers thereof, acrylic acid/hydroxyethyl acrylate copolymers, acrylic acid/disobutylene copolymers, acrylic acid/sulfonic acid derivatives of methacrylate copolymers and mixtures thereof. All of the above listed polymers and copolymers may also be hydrophobically modified to produce the hydrophobic derivatives thereof.

The hydrocolloid and/or acrylic acid polymer dispersants are added to the paper-making system at a location that will allow intimate contact between the dispersant and the contaminated paper stock for a period of at least 30 minutes. The concentration should be sufficient to allow for subsequent dilution so that a concentration of 1 ppm to 30 ppm is maintained on the paper machine or at the point where stickies deposit control is desired. Additionally, the polymeric material may be added to the spray waters utilized during the paper sheet-making process. In this regard, during the formation of the fibrous sheet, the wires and fabrics are subjected to various sprays or showers. To insure against any problems due to stickies on wires, felts or press rolls, it is desirable to also add the polymeric materials of the invention to water showers or sprays that are used to clean and lubricate these parts.

When used in the showers or sprays the polymeric dispersants should be added to the spray water to provide at least 5 ppm. Typical dosages are between 20–50 ppm. Routine experimentation can determine optimum dosages.

The following examples are presented in order to better exhibit the functionality of several specific embodiments of the invention. They are for illustrative purposes only, and it is recognized that minor variations and changes may be made with respect to the compositions employed and the process parameters of operation. For example, one skilled in the art might conceivably employ other similar, but not identical polymers or copolymers not immediately recognized herein. It is to be further understood then, that to the extent any such changes or variations not contemplated herein do not materially alter the process and its results, such variations are considered as falling within the spirit and scope of the invention as later recited in the claims.

EXAMPLE I

In order to establish the efficacy of the polymers of the invention as detackification agents, a peel adhesion test was designed utilizing adhesive backed tapes as stickies from coupons. This test utilized the coupons to represent the sticky contaminant surfaces of a paper-making machine. Polyester film (MYLAR® available from the DuPont Co.) was also used for this purpose. Papermaking forming fabrics are a particular problem area in terms of plugging by adhesive contaminants. Adhesive-backed tape with a styrene butadiene adhesive surface was used since styrene butadiene adhesives are a common sticky contaminant in paper systems. The styrene butadiene adhesives tape is available from 3M company.

The coupons (1×4 inch) were placed in beakers filled with tap water. Different modified hydrocolloid polymers were added to different breakers. The stickies coupons and the polyester film coupons were placed in the respective test solutions so that the adhesive side of the stickies coupon faced away from the polyester film coupon. The beakers were placed in a water bath controlled to a temperature of 50° C. for one (1) hour.

The coupons were then removed from the beakers, laid flat, and blotted so as to remove any excess water. The adhesive side of the stickies coupon was placed in contact with the polyester coupon and pressed to 25 psi between rubber mats in a press with heated platens for 2 minutes.

The average peel strength of the bond formed between the stickies tape coupon and the polyester coupon was determined with an Instron tensile tester at room temperature and a speed of 180 mm/min. The peel strength of the bond formed between the stickies tape coupon and the polyester coupon indicates the tendency of an adhesive stickies contaminant to attach to components of the repulper and/or the paper machine and cause runnability or product quality problems.

The results for this set of tests with polymers comprised of hydrophobically modified guar derivatives are given in Table 1. Each sample was performed in duplicate. Peel adhesion values are given in pounds (lbs.).

TABLE 1

Effect of Hydrophobically Modified Guar Derivatives on the Bond Strength of Styrene Butadiene Adhesive to Polyester Film

| Treatment Concentration | | Peel Strength (lbs) | % Decrease |
| --- | --- | --- | --- |
| 0 ppm | (Control) | 1.66 ± 0.05 | |
| 4 ppm | | 0.11 ± 0.02 | 93% |
| 10 ppm | | 0.065 ± 0.001 | 96% |

Results for a set of tests using sodium acrylic copolymers (maleic anhydride/acrylic copolymer), Colloid® 111D from Rhone-Poulenc, in tap water at pH 7 are given in Table 2. Each sample was performed in duplicate. Peel adhesion values are given in pounds (lbs).

TABLE 2

Effect of Acrylic Copolymer on the Bond Strength of Styrene Butadiene Adhesive to Polyester Film in Tap Water, pH 7

| Treatment Concentration | | Peel Strength (lbs) | % Decrease |
| --- | --- | --- | --- |
| 0 ppm | (Control) | 1.66 ± 0.050 | |
| 4 ppm | | 0.087 ± 0.036 | 94% |
| 10 ppm | | 0.044 ± 0.018 | 97% |

Results for a set of tests using Colloid® 111D (Rhone-Poulenc) in tap water at higher alkalinity (pH 10) are given in Table 3. Each sample condition was performed in duplicate. Peel adhesion values are given in pounds (lbs).

TABLE 3

Effect of Acrylic Copolymer on the Bond Strength of Styrene Butadiene Adhesive to Polyester Film in Tap Water, pH 10

| Treatment Concentration | | Peel Strength (lbs) | % Decrease |
| --- | --- | --- | --- |
| 0 ppm | (Control) | 1.66 ± 0.050 | |
| 4 ppm | | 0.067 ± 0.030 | 96% |
| 10 ppm | | 0.046 ± 0.026 | 97% |

The bonding strength at higher concentrations of calcium and magnesium ions (1000 ppm) were also tested in order to show its effective in presence of high metal ion concentration. Results for this set of tests at pH 7 are given in Table 4. Each sample condition was performed in duplicate. Peel adhesion values are given in pounds (lbs).

TABLE 4

Effect of Acrylic Copolymer on the Bond Strength of Styrene Butadiene Adhesive to Polyester at 1000 ppm ($Ca^{2+}/Mg^{2+}$) pH 7

| Treatment Concentration | | Peel Strength (lbs) | % Decrease |
| --- | --- | --- | --- |
| 0 ppm | (Control) | 1.66 ± 0.050 | |
| 4 ppm | | 0.19 ± 0.037 | 86% |
| 10 ppm | | 0.12 ± 0.032 | 93% |

It can be seen from the above results that hydrophobically modified guar and acrylic copolymers significantly reduced the contact adhesive bond strength between the styrene butadiene adhesive and the polyester surface, even under varied conditions and at different concentrations.

What is claimed is:

1. A method for the detackification of adhesive contaminants and pitch in a system for the processing of paper pulp comprising predominantly secondary fiber, which method comprises adding to the system an addditive which consists of a water soluble dispersant consisting of a water soluble acrylic acid/maleic acid copolymer, wherein the dispersant is added in an amount effective for the detackification of the adhesive contaminants and pitch in the system.

2. The method of claim 1 wherein said acrylic acid/maleic acid copolymer is selected from the group consisting of sodium acrylic acid/maleic acid copolymers, polyacrylamide, acrylamidopropyl sulfonic acid, acrylic acid/methacrylic acid copolymers, acrylic acid/itaconic acid copolymers, acrylic acid/hydroxypropyl acrylate copolymers, maleic acid and maleic acid polymers, acrylic acid/hydroxyethyl acrylate copolymers, acrylic acid/disobutylene copolymers, acrylic acid/sulfonic acid methacrylate copolymers, sodium acrylic acid polymers, their salts and mixtures thereof.

3. The method of claim 1 wherein said dispersant is added to said pulp and secondary fiber in a concentration of from about 1.0 ppm to about 30 ppm.

4. The method of claim 3 wherein said water soluble dispersant contacts said pulp for a period of at 30 minutes.

5. The method of claim 3 wherein said dispersant is added to said pulp and secondary fiber in a furnish.

6. The method of claim 3 wherein said dispersant is sprayed upon secondary paper sheet or matt during roller compaction.

7. The method of claim 3 wherein the adhesive contaminants in the paper pulp is selected from the group consisting of styrene butadiene rubber, vinyl acrylate, polyvinyl alcohol, natural rubber, isoprene polystyrene, polypropylene, ethylene vinyl acetate adhesives and mixtures thereof.

* * * * *